(12) United States Patent
Zhamu et al.

(10) Patent No.: US 10,081,550 B2
(45) Date of Patent: Sep. 25, 2018

(54) DIRECT ULTRASONICATION PRODUCTION OF GRAPHENE SHEETS FROM COKE OR COAL

(71) Applicant: Nanotek Instruments, Inc., Dayton, OH (US)

(72) Inventors: Aruna Zhamu, Springboro, OH (US); Bor Z Jang, Centreville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 95 days.

(21) Appl. No.: 15/193,092

(22) Filed: Jun. 26, 2016

(65) Prior Publication Data

US 2017/0369320 A1 Dec. 28, 2017

(51) Int. Cl.

| | |
|---|---|
| *C01B 32/19* | (2017.01) |
| *C01B 32/184* | (2017.01) |
| *B82Y 40/00* | (2011.01) |
| *H01B 1/04* | (2006.01) |
| *C09D 11/52* | (2014.01) |
| *C09D 171/02* | (2006.01) |
| *C09K 5/14* | (2006.01) |
| *H01B 1/24* | (2006.01) |
| *C09D 7/61* | (2018.01) |
| *C08K 3/04* | (2006.01) |

(52) U.S. Cl.
CPC ............... *C01B 32/19* (2017.08); *C09D 7/61* (2018.01); *C09D 11/52* (2013.01); *C09D 171/02* (2013.01); *C09K 5/14* (2013.01); *H01B 1/24* (2013.01); *C08K 3/04* (2013.01)

(58) Field of Classification Search
CPC ..... B82Y 30/00; B82Y 40/00; C01B 2204/04; C01B 31/0423; C01B 31/0469; C01B 32/19; C01B 32/0423; C01B 32/0469; C01B 32/20; C01B 32/182; H01B 1/04; H01B 1/24
USPC ......... 423/448, 460; 977/755, 775; 252/500, 252/502, 510, 511
See application file for complete search history.

(56) References Cited

U.S. PATENT DOCUMENTS

| | | |
|---|---|---|
| 6,872,330 B2 | 3/2005 | Mack |
| 7,071,258 B1 | 7/2006 | Jang |
| 7,327,000 B2 | 2/2008 | DeHeer |
| 7,623,340 B1 | 11/2009 | Song |

(Continued)

OTHER PUBLICATIONS

PCT/US17/35779, International Search Report and Written Opinion dated Aug. 17, 2017, 7 pages.

(Continued)

*Primary Examiner* — Tri V Nguyen

(57) ABSTRACT

Provided is a method of producing isolated graphene sheets from a supply of coke or coal powder containing therein domains of hexagonal carbon atoms and/or hexagonal carbon atomic interlayers. The method comprises: (a) dispersing particles of the coke or coal powder in a liquid medium containing therein an optional surfactant or dispersing agent to produce a suspension or slurry, wherein the coke or coal powder is selected from petroleum coke, coal-derived coke, meso-phase coke, synthetic coke, leonardite, anthracite, lignite coal, bituminous coal, or natural coal mineral powder, or a combination thereof; and (b) exposing the suspension or slurry to ultrasonication at an energy level for a sufficient length of time to produce the isolated graphene sheets.

19 Claims, 2 Drawing Sheets

(56) References Cited

U.S. PATENT DOCUMENTS

| | | | |
|---|---|---|---|
| 7,948,739 B2 | 5/2011 | Zhamu | |
| 2005/0271574 A1 | 12/2005 | Jang | |
| 2008/0048152 A1 | 2/2008 | Jang | |
| 2008/0268318 A1 | 10/2008 | Jang et al. | |
| 2008/0279756 A1* | 11/2008 | Zhamu | C01B 32/225 423/448 |
| 2009/0061312 A1 | 3/2009 | Zhamu | |
| 2010/0021819 A1 | 1/2010 | Zhamu | |
| 2010/0272628 A1 | 10/2010 | Kim et al. | |
| 2011/0017585 A1 | 1/2011 | Zhamu et al. | |
| 2012/0237435 A1* | 9/2012 | Petrik | B82Y 30/00 423/447.1 |
| 2014/0242275 A1* | 8/2014 | Zhamu | C01B 31/0469 427/228 |
| 2016/0060122 A1* | 3/2016 | Tour | C01B 31/0446 423/415.1 |

OTHER PUBLICATIONS

Bor Z. Jang and A. Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Reid, R.C.; Prausnitz, J.M. and Poling, B.E, The Properties of Gases and Liquids, McGraw-Hill, New York, p. A.5-A.19, 2000.

\* cited by examiner

DIRECT ULTRASONICATION PRODUCTION OF GRAPHENE SHEETS FROM COKE OR COAL

FIELD OF THE INVENTION

The present invention relates to a method of producing isolated thin graphene sheets (single-layer or few-lay) directly from natural coal or coal derivatives (e.g. needle coke) using direct ultrasonication.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) Both heat- and solution-induced exfoliation approaches require a very tedious washing and purification step. For instance, typically 2.5 kg of water is used to wash and recover 1 gram of GIC, producing huge quantities of waste water that need to be properly treated.
(5) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.
(6) Furthermore, the quantity of intercalation solution retained on the flakes after draining may range from 20 to 150 parts of solution by weight per 100 parts by weight of graphite flakes (pph) and more typically about 50 to 120 pph.

(7) During the high-temperature exfoliation, the residual intercalate species (e.g. sulfuric acid and nitric acid) retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene PSheets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating natural graphite with potassium metal melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemicals (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and less damaged), more electrically conductive, and larger/wider graphene sheets.

Furthermore, most of the prior art processes for graphene production begin with the use of highly purified natural graphite as the starting material. The purification of graphite ore involves the use of large amounts of undesirable chemicals. Clearly, a need exists to have a more cost-effective process that produces graphene sheets (particularly single-layer graphene and few-layer graphene sheets) directly from coal or coal derivatives. Such a process not only avoids the environment-polluting graphite ore purification procedures but also makes it possible to have low-cost graphene available. As of today, the graphene, as an industry, has yet to emerge mainly due to the extremely high graphene costs that have thus far prohibited graphene-based products from being widely accepted in the marketplace.

SUMMARY OF THE INVENTION

The present invention provides a method of producing isolated graphene sheets having an average thickness smaller than 10 nm (preferably and typically single-layer graphene or few-layer graphene) directly from a coke or coal powder having hexagonal carbon atomic interlayers or domains (graphene planes or graphene domains) with an interlayer spacing (inter-graphene plane spacing).

The method comprises: (a) dispersing particles of a coke or coal powder in a liquid medium containing therein an optional surfactant or dispersing agent to produce a suspension or slurry, wherein the coke or coal powder is selected from petroleum coke, coal-derived coke, meso-phase coke, synthetic coke, leonardite, anthracite, lignite coal, bituminous coal, or natural coal mineral powder, or a combination thereof; and (b) exposing the suspension or slurry to ultra-sonication at an energy level for a sufficient length of time to produce the isolated graphene sheets dispersed in the liquid medium.

In certain embodiments, the suspension does not contain this optional surfactant. Preferably, however, the suspension contains a surfactant or dispersing agent, which can prevent re-stacking of graphene sheets while being formed. This leads to thinner graphene sheets, mostly single-layer.

The method can further comprise a step of drying (removing) the liquid medium to recover said isolated graphene sheets in a dry powder form.

In certain embodiments, the coke or coal powder particles have never been previously intercalated or oxidized prior to execution of step (a). This obviates the need to use those undesirable chemicals, such as concentrated sulfuric acid and nitric acid. It is surprising to observe that isolation of separate graphene sheets from a coal or coke particle does not require the utilization of these chemicals that are known to have high power of intercalating and/or oxidizing the graphite particles. This is one of the special and unexpected features of the presently invented "direct ultrasonication" method. The word "direct" means no previous exposure to strong acids and/or strong oxidizing agents is required of the coal/coke particles.

The method can be conducted under mild conditions; i.e. no high temperature, high pressure, or high vacuum is required. Typically, the ultrasonication step is conducted at a temperature lower than 100° C. Typically, the sonic energy level is greater than 80 watts.

In certain embodiments, the ultrasonication step is followed by a mechanical shearing treatment selected from air milling, air jet milling, wet milling, ball milling, rotating blade shearing, or a combination thereof.

In certain embodiments, the liquid medium comprises water, organic solvent, alcohol, a monomer, an oligomer, or a resin. It is a pleasant surprise that environmentally benign liquids, such as water and ethylnol, are an effective liquid medium for transmitting ultrasonic waves in such a manner that graphene planes in a graphitic domain of a coke or coal-derived structure can be exfoliated and separated. It is quite unexpected that monomer or oligomer molecules, when present, can be polymerized while graphene sheets are being isolated (produced), allowing well mixing of graphene sheets in the resulting polymer matrix. In other words, this method enables the integration of three functions or steps (graphene production, polymerization of a monomer/oligomer, and dispersion of graphene sheets in a polymer matrix) into a single step.

The surfactant or dispersing agent may be selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

Particularly effective surfactants or dispersing agents are melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), and combinations thereof.

In some embodiments, the method is conducted intermittently or continuously and the supply of coke or coal powder and the liquid medium are provided into an ultrasonication chamber intermittently or continuously.

The isolated graphene sheets dispersed in the liquid medium as produced in step (b) form a graphene slurry. The concentration of graphene sheets in this graphene slurry can be adjusted to enable coating, spraying, casting, or printing. For instance, the graphene slurry may be deposited onto a surface of a solid substrate to form a wet graphene film under the influence of a shear stress or compressive stress to align the graphene sheets substantially parallel to the substrate surface, and wherein said wet film is dried to form a dry graphene film.

The wet graphene film or dry graphene film is subjected to a heat treatment at a temperature from 100° C. to 3,200° C. (preferably between 500° C. to 2,800° C. and more preferably between 1,000° C. to 2,600° C.).

The isolated graphene sheets dispersed in the liquid medium as produced in step (b) form a graphene slurry and the method may further comprise a step of adding a modifier or chemical species to produce an ink composition. This modifier or chemical species can be any of those materials used to adjust the ink viscosity or to achieve desired ink properties after printing (e.g. electrical conductivity, thermal conductivity, dielectric constant, color, strength, adhesion, scratch resistance, surface hardness, etc.).

In another embodiment, the isolated graphene sheets dispersed in the liquid medium produced in step (b) form a graphene slurry and the method further comprise a step of adding a resin and an optional property modifier to produce a graphene-resin dispersion.

DETAILED DESCRIPTION OF PREFERRED EMBODIMENTS

Figure 1:
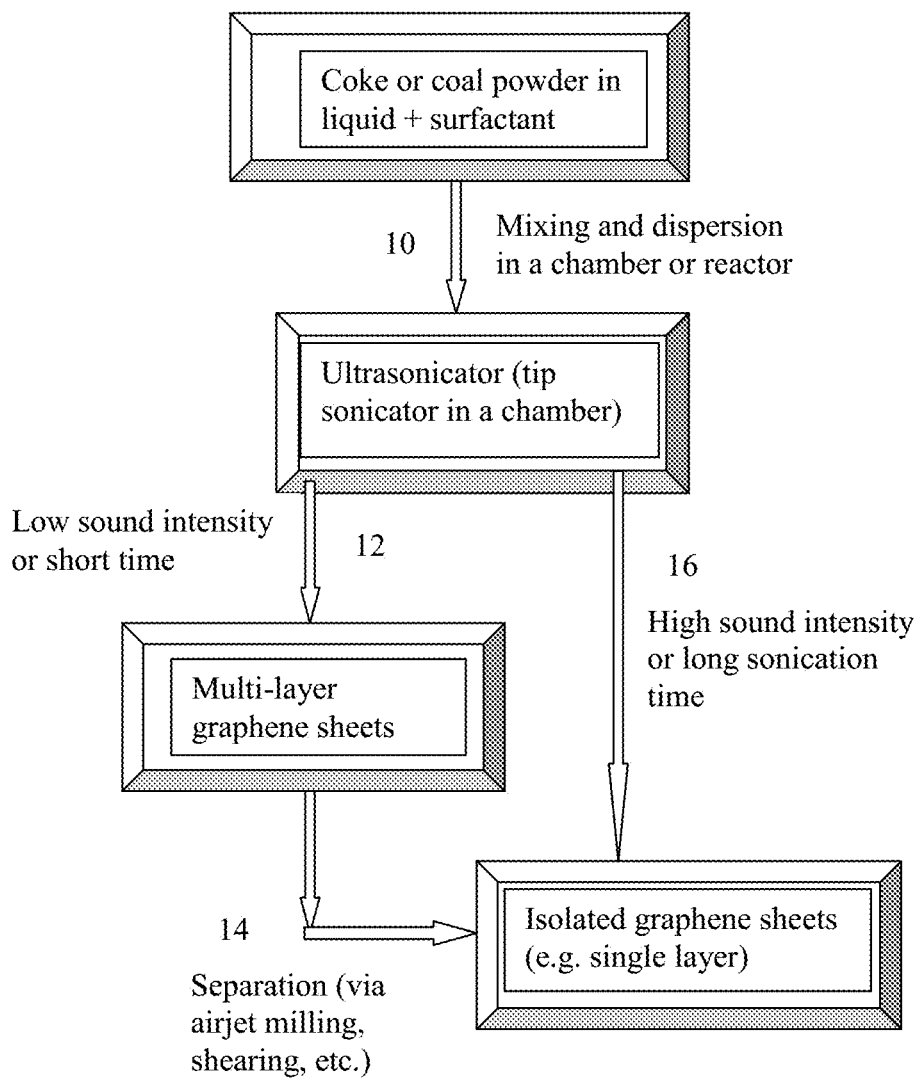
FIG. 1 A flow chart showing an embodiment of the presently invented method of producing isolated graphene sheets.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Basically, a graphite material is composed of many graphene planes (hexagonal carbon atomic interlayers) stacked together having inter-planar spacing. These graphene planes can be exfoliated and separated to obtain isolated graphene sheets that can each contain one graphene plane or several graphene planes of hexagonal carbon atoms. Further, natural graphite refers to a graphite material that is produced from purification of graphite mineral (mined graphite ore or graphite rock) typically by a series of flotation and acid treatments. Particles of natural graphite are then subjected to intercalation/oxidation, expansion/exfoliation, and separation/isolation treatments as discussed in the Background section.

The instant invention obviates the need to go through the graphite purification procedures that otherwise generate great amounts of polluting chemicals. In fact, the instant invention avoids the use of natural graphite all together as a starting material for the production of graphene sheets. Instead, we begin with coal or its derivatives (including coke, particularly needle coke). No undesirable chemicals, such as concentrated sulfuric acid, nitric acid, and potassium permanganate, are used in the presently invented method.

One preferred specific embodiment of the present invention is a method of producing isolated graphene sheets, also called nano graphene platelets (NGPs), directly from coal powder without purification. We have surprisingly discovered that powder of coal (e.g. leonardite or lignite coal) contains therein graphene-like domains or aromatic molecules that span from 5 nm to 1 μm in length or width. These graphene-like domains contain planes of hexagonal carbon atoms and/or hexagonal carbon atomic interlayers with an interlayer spacing. These graphene-like planes or molecules or interlayers are typically interconnected with disordered chemical groups containing typically C, O, N, P, and/or H. The presently invented method is capable of intercalating, exfoliating, and/or separating the interlayers and/or separating graphene-like planes or domains from the surrounding disordered chemical species to obtain isolated graphene sheets.

Each graphene sheet comprises one or multiple planes of two-dimensional hexagonal structure of carbon atoms. Each graphene sheet has a length and a width parallel to the graphene plane and a thickness orthogonal to the graphene plane. By definition, the thickness of an NGP is 100 nanometers (nm) or smaller (more typically <10 nm and most typically and desirably <3.4 nm (<10 layers or 10 graphene planes), with a single-sheet NGP (single-layer graphene) being as thin as 0.34 nm. The length and width of a NGP are typically between 5 nm and 10 μm, but could be longer or shorter. Generally, the graphene sheets produced from the coal or coke powder using the presently invented method are single-layer graphene or few-layer graphene (2-10 graphene planes stacked together).

Figure 2:
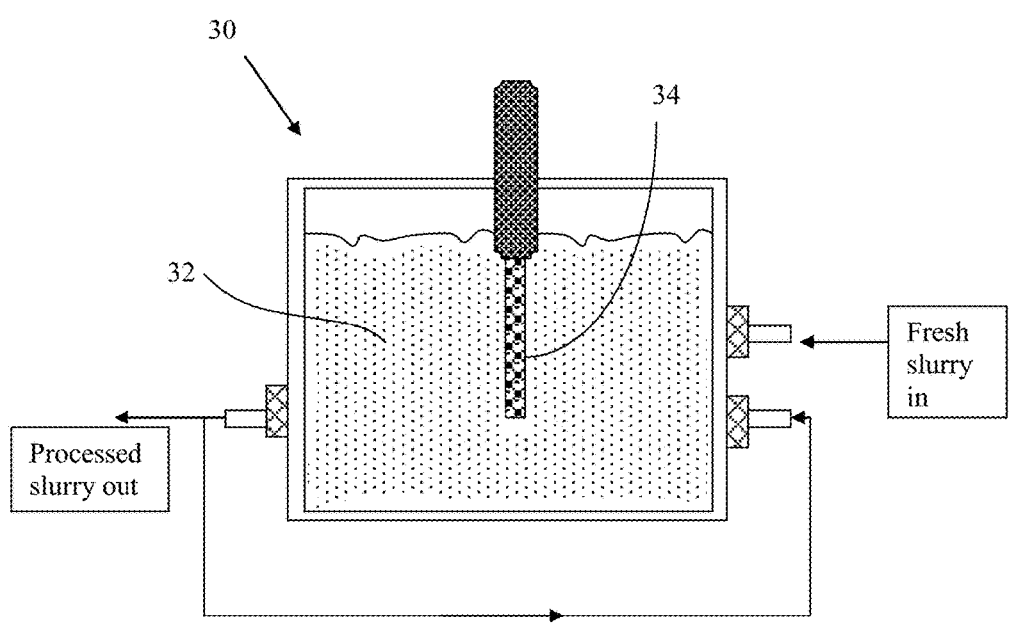
FIG. 2 Schematic drawing of an apparatus that submits coal/coke slurry to ultrasonication to produce isolated graphene sheets.

As schematically shown in FIG. 1 and FIG. 2, the presently invented method comprises two steps. Step (a) entails dispersing particles of a coke or coal powder in a liquid medium containing therein an optional surfactant or dispersing agent to produce a suspension or slurry (32 in FIG. 2). This step (10 in FIG. 1) can include filling coke/coal powder and the liquid medium (with or without a surfactant) into a chamber or reactor 30, which contains an ultrasonicator tip 34. Multiple tips can be implemented in a reactor if deemed necessary. The coke or coal powder may be selected from petroleum coke, coal-derived coke, mesophase coke, synthetic coke, leonardite, anthracite, lignite coal, bituminous coal, or natural coal mineral powder, or a combination thereof.

Step (b) entails exposing the suspension or slurry to ultrasonication at an energy level for a sufficient length of time to produce the isolated graphene sheets. As illustrated in FIG. 1, one can choose to use low sonic wave intensity and/or shorter ultrasound exposure time (12) to produce thicker NGPs, each typically containing from 5 to 20 graphene planes. This is followed by subjecting the thick NGPs to mechanical separation treatments 14 (e.g. air jet milling, rotating-blade shearing, wet milling, etc.) to obtain thinner graphene sheets. Alternatively, one could use higher sonic power for a longer period of time to directly produce thin graphene sheets (16 in FIG. 1). This can be readily accomplished by continuously or intermittently pumping the slurry out of the chamber and then re-circulating back to the chamber or into a second chamber, as illustrated in FIG. 2. A cascade of ultrasonicator chambers may be connected in series.

Using needle coke as an example, the first step may involve preparing a coke powder sample containing fine needle coke particulates (needle-shaped). The length and/or diameter of these particles are preferably less than 0.2 mm (<200 μm), further preferably less than 0.01 mm (10 μm). They can be smaller than 1 μm. The needle coke particles typically contain nanometer-scaled graphite crystallites with each crystallite being composed of multiple graphene planes.

The powder is then dispersed in a liquid medium (e.g., water, alcohol, or acetone) to obtain a suspension or slurry with the particles being suspended in the liquid medium. Preferably, a dispersing agent or surfactant is used to help uniformly disperse particles in the liquid medium. Most importantly, we have surprisingly found that the dispersing agent or surfactant facilitates the exfoliation and separation of the laminar material. Under comparable processing conditions, a coke/coal sample containing a surfactant usually results in much thinner platelets compared to a sample containing no surfactant. It also takes a shorter length of time for a surfactant-containing suspension to achieve a desired platelet dimension.

Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium ligno-sulphonate (e.g., marketed under the trade names Vanisperse CB and Marasperse CBOS-4 from Borregaard LignoTech), sodium sulfate, sodium phosphate, and sodium sulfonate.

Advantageously, the surfactant or dispersing agent may be selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof It may be noted that the formation of graphite intercalation compound (GICs) involves the use of highly oxidizing agents (e.g. nitric acid or potassium permanganate), which causes severe oxidation to graphite. Upon oxidation, graphite would suffer from a dramatic loss in electrical and thermal conductivity and this normally cannot be fully recovered.

In contrast, the presently invented method makes use of an ultrasonication temperature typically lying between 0° C. and 100° C. and only very mild liquid mediums are used (water, alcohol, etc.). Hence, this method obviates the need or possibility to expose the layered coke/coal material to an oxidizing environment. If so desired, the product after ultrasonication may be subjected to a subsequent mechanical shearing treatment, such as ball milling, air milling, or rotating-blade shearing, at a relatively low temperature (e.g., room temperature). With this treatment, either individual graphene planes or stacks of graphene planes bonded together (multi-layer NGPs) are further reduced in thickness (decreasing number of layers), width, and length. In addition to the thickness dimension being nano-scaled, both the length and width of these NGPs could be reduced to smaller than 100 nm in size if so desired.

In the thickness direction (or c-axis direction normal to the graphene plane), there may be a small number of graphene planes that are still bonded together through the van der Waal's forces that commonly hold the basal planes together. Typically, there are less than 15 layers (often less than 5 layers) of graphene planes. High-energy planetary ball mills and rotating blade shearing devices were found to be particularly effective in producing thinner sheets. Since ball milling and rotating-blade shearing are considered as mass production processes, the presently invented method is capable of producing large quantities of graphene materials cost-effectively. This is in sharp contrast to the production and purification processes of carbon nano-tubes, which are slow and expensive.

The exfoliation step in the instant invention does not involve the evolution of undesirable species, such as $NO_x$ and $SO_x$, which are common by-products of exfoliating conventional sulfuric or nitric acid-intercalated graphite compounds. These chemical species are highly regulated worldwide.

Ultrasonic energy also enables the resulting graphene sheets to be well dispersed in the very liquid medium wherein the coke/coal powder is dispersed, producing a homogeneous suspension. One major advantage of this approach is that exfoliation, separation, and dispersion of graphene sheets are achieved in a single step. A monomer, oligomer, or polymer may be added to this suspension to form a suspension that is a precursor to a nanocomposite structure. The process may include a further step of converting the suspension to a mat or paper (e.g., using any well-known paper-making process), or converting the nanocomposite precursor suspension to a nanocomposite solid.

Thus, in certain embodiments, the liquid medium comprises water, organic solvent, alcohol, a monomer, an oligomer, or a combination thereof. In other embodiments, the liquid medium further comprises a monomer or an oligomer dispersed in the liquid medium and step (b) induces polymerization of the monomer or oligomer to form a polymer. The graphene sheets concurrently produced can be well-dispersed in the polymer. This added advantage is also unexpected.

In some embodiments of the invention, the liquid medium further comprises a polymer dissolved or dispersed in the liquid medium and the isolated graphene sheets are mixed with the polymer to form a composite composition. This is a good approach to the preparation of graphene-reinforced polymer composites.

Alternatively, the resulting graphene sheets, after drying to become a solid powder, may be mixed with a monomer to form a mixture, which can be polymerized to obtain a nanocomposite solid. The graphene sheets can be mixed with a polymer melt to form a mixture that is subsequently solidified to become a nanocomposite solid.

Again, the wetting agent may be selected from melamine, ammonium sulfate, sodium dodecyl sulfate, sodium (ethylenediamine), tetraalkyammonium, ammonia, carbamide, hexamethylenetetramine, organic amine, poly(sodium-4-styrene sulfonate), or a combination thereof. We have surprisingly observed several advantages that can be achieved by adding a wetting agent in the electrolyte, in addition to an intercalating agent. Typically, the addition of a wetting agent to the liquid medium leads to thinner graphene sheets as compared to the liquid medium containing no wetting agent. This is reflected by the typically larger specific surface areas per unit mass of graphene sheets produced after exfoliation as measured by the well-known BET method. It seems that the wetting agent can readily spread into inter-layer spaces, stick to a graphene plane, and prevent graphene sheets, once formed, from being re-stacked together. This is a particularly desirable feature considering the fact that graphene planes, when separated, have a great tendency to re-stack again. The presence of these graphene plane wetting agents serves to prevent re-stacking of graphene sheets.

Some of the wetting agents (e.g. those containing an amine group) also serve to chemically functionalize the isolated graphene sheets, thereby improving the chemical or mechanical compatibility of the graphene sheets with a matrix resin (e.g. epoxy) in a composite material.

The following examples serve to provide the best modes of practice for the present invention and should not be construed as limiting the scope of the invention:

Example 1: Production of Isolated Graphene Sheets from Milled Coal-Derived Needle Coke Powder Needle coke, milled to an average length <10 μm, was used as the anode material. Five grams of needle coke powder were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of needle coke particles for a period of 2 hours. Various samples were collected with their morphology studied by SEM, TEM, and AFM observations and their specific surface areas measured by the well-known BET method. The specific surface area of the produced graphene sheets are typically in the range of 840-950 $m^2/g$, indicating that a majority of the graphene sheets being single-layer graphene, consistent with the microscopy results.

Comparative Example 1: Concentrated Sulfuric-Nitric Acid-Intercalated Needle Coke Particles One gram of milled needle coke powder as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,000° C. for 45 seconds. The resulting NGPs were examined using SEM and TEM and their length (largest lateral dimension) and thickness were measured. It was observed that, in comparison with the conventional strong acid process for producing graphene, the presently invented electrochemical intercalation method leads to graphene sheets of comparable thickness distribution, but much larger lateral dimensions (3-5 μm vs. 200-300 nm). Graphene sheets were made into graphene paper layer using a well-known vacuum-assisted filtration procedure. The graphene paper prepared from hydrazine-reduced graphene oxide (made from sulfuric-nitric acid-intercalated coke) exhibits electrical conductivity values of 11-143 S/cm. The graphene paper prepared from the relatively oxidation-free graphene sheets made by the presently invented electrochemical intercalation exhibit conductivity values of 1,600-3,720 S/cm.

Example 2: Production of Isolated Graphene Sheets from Milled Coal-Derived Needle Coke Powder (No Dispersing Agent)

Five grams of needle coke from the same batch as used in Example 1 were dispersed in 1,000 mL of deionized water to obtain a suspension. An ultrasonic energy level of 85 W (Branson 5450 Ultrasonicator) was used for exfoliation, separation, and size reduction for a period of 2 hours. Various samples were collected with their morphology studied by SEM and TEM observations and their specific surface areas measured by the well-known BET method. The specific surface area of the produced graphene sheets are typically in the range of 240-450 $m^2/g$ (mostly few-layer graphene). Certain amounts of the sample containing mostly multi-layer graphene sheets were then subjected to ultra-sonication again to produce ultra-thin graphene sheets. Electron microscopic examinations of selected samples indicate that the majority of the resulting NGPs are single-layer graphene sheets.

Example 3: Production of Isolated Graphene Sheets from Milled Petroleum Needle Coke Powder Needle coke, milled to an average length <10 μm, was used as the anode material and 1,000 mL of DI water. The dispersing agents selected include melamine, sodium (ethylenediamine), and hexamethylenetetramine. An ultrasonic energy level of 125 W (Branson S450 Ultrasonicator) was used for exfoliation, separation, and size reduction for a period of 1 hour. The specific surface area of the produced graphene sheets are typically in the range of 740-880 $m^2/g$ (mostly single-layer graphene). Melamine appears to be the most effective dispersing agent, leading to the highest specific surface areas of graphene sheets.

Products containing a majority of graphene sheets being single-layer graphene can be readily produced using the presently invented direct ultrasonication method.

Example 4: Graphene Sheets from Milled Lignite Coal Powder

In one example, samples of two grams each of lignite coal were milled down to an average diameter of 25.6 µm. The powder samples were subjected to similar direct ultrasonication conditions described in Example 1. After a mechanical shearing treatment in a high-shear rotating blade device for 15 minutes, the resulting graphene sheets exhibit a thickness ranging from single-layer graphene sheets to 8-layer graphene sheets based on SEM and TEM observations.

Example 5: Direct Ultrasonic Production of Isolated Graphene Sheets from Anthracite Coal Taixi coal from Shanxi, China was used as the starting material for the preparation of isolated graphene sheets. The raw coal was ground and sieved to a powder with an average particle size less than 200 µm. The coal powder was further size-reduced for 2.5 h by ball milling. The diameter of more than 90% of milled powder particles is less than 15 µm after milling. The raw coal powder was treated with hydrochloride in a beaker at 50° C. for 4 h to make modified coal (MC), and then it was washed with distilled water until no Cl$^-$ was detected in the filtrate. The modified coal was heat treated in the presence of Fe to transform coal into graphite-like carbon. The MC powder and $Fe_2(SO4)_3$ [TX-de:$Fe_2(SO4)_3$=16:12.6] was well-mixed by ball milling for 2 min, and then the mixture was subjected to catalytic graphitization at 2400° C. for 2 h under argon.

The coal-derived powder samples were subjected to ultrasonication under conditions that are comparable to those used in Example 1. The resulting graphene sheets exhibit a thickness ranging from single-layer graphene sheets to 5-layer graphene sheets based on SEM and TEM observations.

Example 6: Production of Isolated Graphene Sheets from Bituminous Coal

In an example, 300 mg of bituminous coal was dispersed in a mixture of water-alcohol (1 L), which was then subjected to an ultrasonication treatment at a power level of 145 watts for 1 h. The solution was cooled to room temperature and poured into a beaker containing 100 ml ice. After purification, the solution was concentrated using rotary evaporation to obtain solid humic acid sheets.

Example 7: Graphene Nanocomposites

Approximately 2 grams of graphene sheets prepared in Example 1 were added to 100 mL of water and a 0.2% by weight of a surfactant, sodium dodecylsulfate (SDS), to form a slurry, which was then subjected to ultrasonication at approximately 20° C. for five minutes. A stable dispersion (suspension) of well-dispersed graphene sheets was obtained. A water-soluble polymer, polyethylene glycol (1% by weight), was then added to the suspension. Water was later vaporized, resulting in a nanocomposite containing graphene sheets dispersed in a polymer matrix.

Example 8: Production of Graphene Thin Films

In the aforementioned Example 1, a desired amount of slurry containing fully separated graphene sheets dispersed in water was made into a wet film on a PET substrate (poly ethylene terephthalate) using a slot-die coater. The wet film was then heated at 85° C. for 2 hours and mechanically compressed to become a flexible graphene film. The resulting flexible graphene film, having not been previously exposed to a significant oxidation environment, exhibits an electrical conductivity typically from 5,000 to 7,500 S/cm and thermal conductivity from 650 to 1,200 W/mK. By contrast, commercially available flexible graphite sheets, prepared by thermal exfoliation of GICs and re-compression of exfoliated graphite, exhibit an electrical conductivity typically lower than 1,200 S/cm and thermal conductivity lower than 500 W/mK. Also, graphene films produced by the conventional Hummer's method and the subsequent slot-die coating under comparable conditions show an electrical conductivity of 1,500-3,000 S/cm and thermal conductivity 400-600 W/mK.

The invention claimed is:

1. A method of producing isolated graphene sheets from a supply of coke or coal powder containing therein domains of hexagonal carbon atoms and/or hexagonal carbon atomic interlayers with an interlayer spacing, said method comprising:
    (a) dispersing particles of said coke or coal powder in a liquid medium containing therein a surfactant or dispersing agent to produce a suspension or slurry and containing no oxidant or acid, wherein said coke or coal powder is selected from petroleum coke, coal-derived coke, meso-phase coke, synthetic coke, leonardite, anthracite, lignite coal, bituminous coal, or natural coal mineral powder, or a combination thereof; and
    (b) exposing said suspension or slurry to ultrasonication at an energy level for a sufficient length of time to produce said isolated graphene sheets in said liquid medium.

2. The method of claim 1 wherein said particles of said coke or coal powder have never been previously intercalated or oxidized prior to step (a).

3. The method of claim 1, further comprising a step of removing said liquid medium to recover said isolated graphene sheets in a dry powder form.

4. The method of claim 1 wherein said ultrasonication step is conducted at a temperature lower than 100° C.

5. The method of claim 1 wherein said energy level is greater than 80 watts.

6. The method of claim 1 wherein said ultrasonication step is followed by a mechanical shearing treatment selected from air milling, air jet milling, wet milling, ball milling, rotating blade shearing, or a combination thereof.

7. The method of claim 1 wherein said liquid medium comprises water, organic solvent, alcohol, a monomer, an oligomer, or a combination thereof.

8. The method of claim 1 wherein said liquid medium further comprises a monomer or an oligomer dispersed in said liquid medium and said step (b) induces polymerization of said monomer or oligomer to form a polymer.

9. The method of claim 1 wherein said liquid medium further comprises a polymer dissolved or dispersed in said liquid medium and said isolated graphene sheets are mixed with said polymer to form a composite composition.

10. The method of claim 1 wherein said surfactant or dispersing agent is selected from the group consisting of anionic surfactants, nonionic surfactants, cationic surfactants, amphoteric surfactants, silicone surfactants, fluorosurfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

11. The method of claim 1 wherein said surfactant or dispersing agent is selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof.

12. The method of claim 1, wherein said method is conducted intermittently or continuously and said supply of coke or coal powder and said liquid medium are provided into an ultrasonication chamber intermittently or continuously.

13. The method of claim 1, wherein said isolated graphene sheets dispersed in said liquid medium produced in step (b) form a graphene slurry, which is deposited onto a surface of a solid substrate to form a wet graphene film under the influence of a shear stress or compressive stress to align said graphene sheets parallel to said substrate surface, and wherein said wet film is dried to form a dry graphene film.

14. The method of claim 13, wherein said slurry is deposited onto said surface using a procedure of casting, coating, spraying, printing, or a combination thereof.

15. The method of claim 13, wherein said wet graphene film or dry graphene film is subjected to a heat treatment at a temperature from 100° C. to 3,200° C.

16. The method of claim 1, wherein said isolated graphene sheets dispersed in said liquid medium produced in step (b) form a graphene slurry and said method further comprises a step of adding a property modifier or chemical species to produce an ink composition.

17. The method of claim 1, wherein said isolated graphene sheets dispersed in said liquid medium produced in step (b) form a graphene slurry and said method further comprises a step of adding a resin and an optional property modifier to produce a graphene-resin dispersion.

18. The method of claim 17, further comprising a step of converting said graphene-resin dispersion into a composite material.

19. The method of claim 1, wherein said isolated graphene sheets dispersed in said liquid medium produced in step (b) form a graphene slurry and said method further comprises a step of adding a property modifier to produce a graphene-containing ink composition.

* * * * *